Dec. 5, 1939.         W. A. EATON         2,182,047
BRAKE MECHANISM
Filed July 7, 1938         2 Sheets-Sheet 1
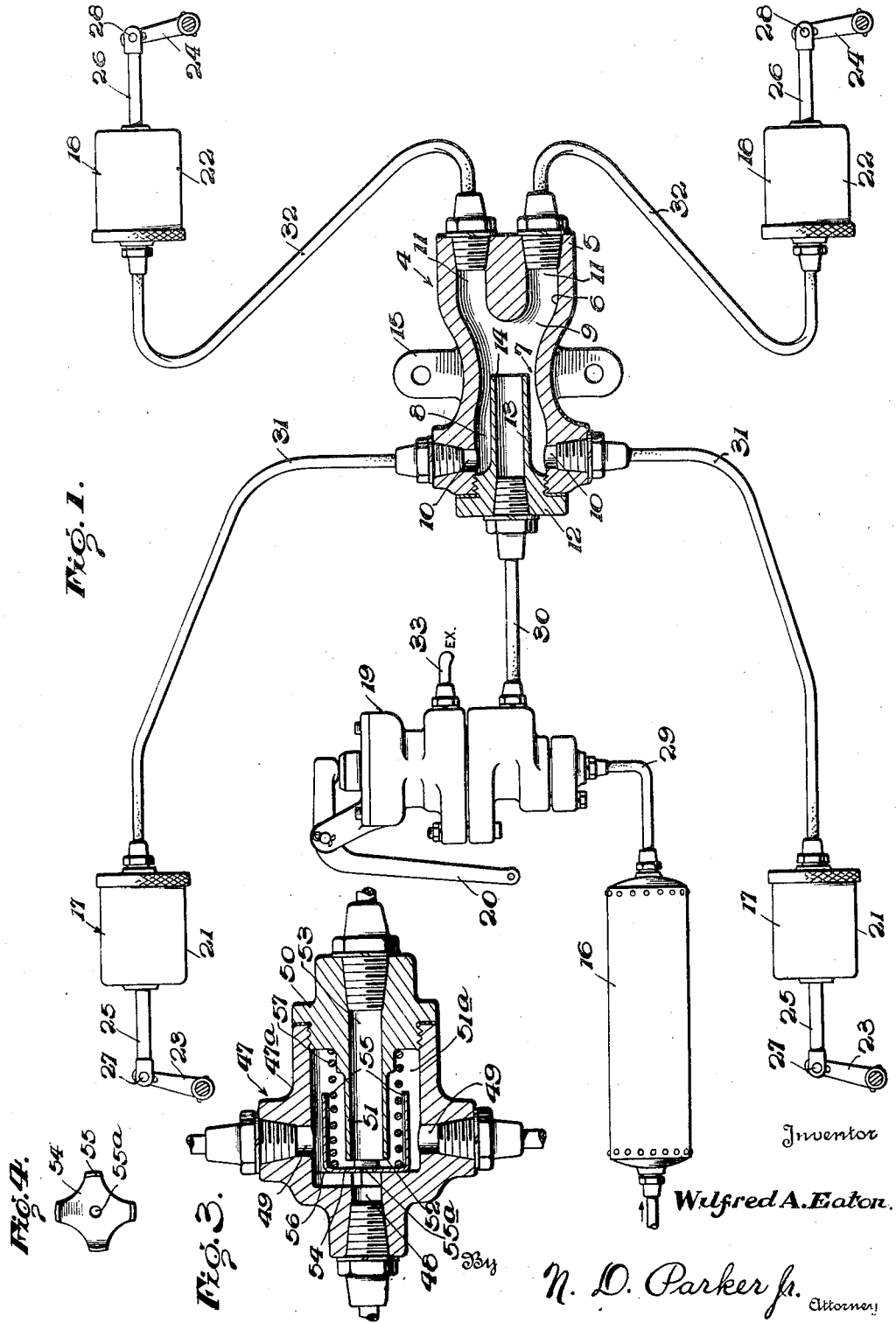
Inventor
Wilfred A. Eaton.
By N. D. Parker Jr.
Attorney

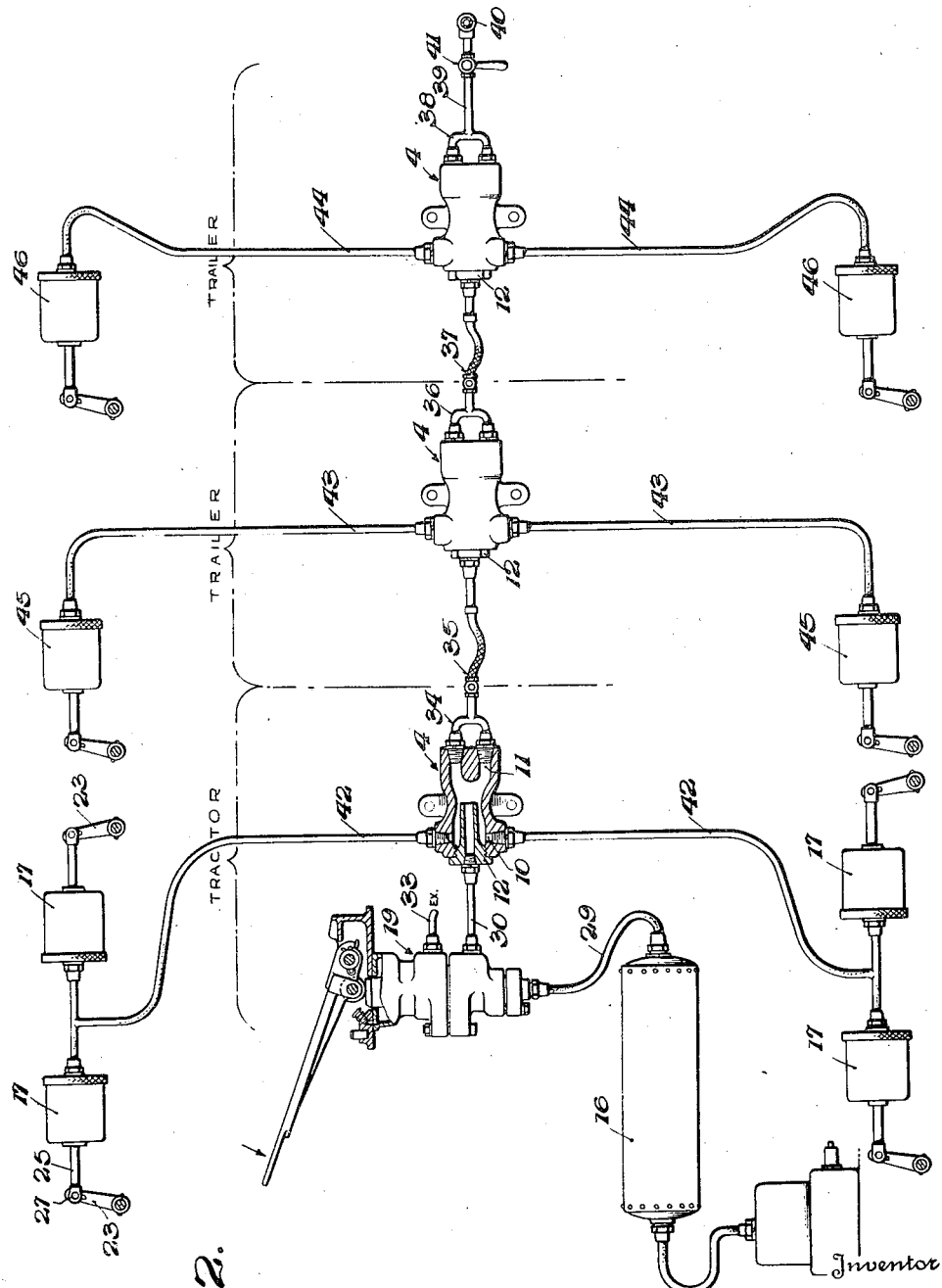

Patented Dec. 5, 1939

2,182,047

UNITED STATES PATENT OFFICE 2,182,047

BRAKE MECHANISM

Wilfred A. Eaton, Pittsburgh, Pa., assignor to Bendix-Westinghouse Automotive Air Brake Company, Pittsburgh, Pa., a corporation of Delaware Application July 7, 1938, Serial No. 217,940

17 Claims. (Cl. 188—3)

This invention relates to control mechanism for fluid pressure brake systems and more particularly to a construction whereby the flow of fluid in such systems may be efficiently and automatically controlled.

It has heretofore been found desirable in fluid pressure brake systems for vehicles of a train having brakes on the different axles to have the rear brakes apply first and the other brakes apply progressively thereafter. Devices such as choked ports have been previously used at suitable points in the fluid pressure conduits leading to the various brake actuators to accomplish this end, but these have had the disadvantage of delaying the release of the brakes. In order to effect a progressive brake application on a train of vehicles, it has also been necessary to progressively graduate the size of the choked ports on the various vehicles, making it essential that the vehicles so equipped occupy at all times the same relative positions in the train.

An object of the present invention is to provide a simple and efficient device for effecting a differential rate of fluid flow to different brake actuators on a train of vehicles.

Another object is to provide a fluid flow control device adapted to effect a differential rate of fluid flow to different brake actuators during initial operation thereof and so constituted as to effect equalization of the pressures in said actuators thereafter.

A further object is to provide a fluid flow control device adapted for installation on each vehicle of a vehicle train and so constituted as to effect a progressive application of the vehicle brakes starting at the rear end of the train and progressive release of the brakes starting at the front end of the train.

A still further object is to provide devices for controlling the flow of fluid to a series of brake actuators which will be effective in establishing progressive operation of the actuators regardless of their capacity.

Still another object is to provide devices for use with a series of vehicles for effecting progressive actuation of the brakes thereof regardless of changes in the relative positions of the vehicles in the series.

Yet another object is to provide a fluid flow control device controlled by the flow of fluid to a series of brake actuators to delay the operation of some of the actuators.

These and other objects of the invention will become more readily apparent from the following description when considered in connection with the accompanying drawings. It is to be expressly understood, however, that the drawings are employed for purposes of illustration only and are not designed as a definition of the limits of the invention, reference being had for this purpose to the appended claims.

In the drawings, wherein similar reference characters refer to similar parts throughout the several views:

Fig. 1 is a diagrammatic view, partially in section, of a brake system incorporating a fluid flow control device constructed in accordance with the principles of the present invention;

Fig. 2 is a diagrammatic view, partially in section, showing the application of the control device shown in Fig. 1 to a train of vehicles.

Fig. 3 is an axial sectional view illustrating a modified form of fluid flow control device which may be employed, and Fig. 4 is a plan view of a valve member illustrated in section in Fig. 3.

Referring more particularly to Fig. 1, a control device 4 constructed in accordance with the principles of the present invention is disclosed therein as comprising a casing 5 having an inner wall 6 curved inwardly at the center of the casing to form a restricted passage 7 and outwardly at either end to form enlarged passages 8 and 9. Outlet ports 10 and 11 are formed in the casing adjacent the enlarged chambers 8 and 9 respectively, and the left end of the casing is adapted to threadedly receive a nozzle member 12 having a bore 13 therein, said bore terminating in an end portion 14 which may be positioned longitudinally of the casing at a point substantially coincident with the reduced diameter of the restricted passage 7. Suitable bracket portions 15 are provided on the outside of the casing for mounting the casing on the frame of the vehicle, not shown.

As further shown in Fig. 1, the fluid flow control device 4 is associated with a fluid pressure brake system which may comprise a reservoir 16, a pair of front brake actuators 17, a pair of rear brake actuators 18, and a brake control valve 19 having an operating lever 20. The brake valve 19 is preferably of the well known self-lapping type and may be constructed as set forth in the patent to Wilfred A. Eaton, No. 2,112,484, dated March 29, 1938. The brake actuators 17 and 18 are of well known construction having cylinders 21 and 22 enclosing slidably mounted pistons, not shown, and adapted under the influence of a fluid pressure differential to actuate the brake operating levers 23 and 24 by means of piston rods 25 and 26 connected thereto by pivot pins 27 and 28 respectively. In order that the brake valve may be effective in controlling the flow of fluid pressure to and from the actuators 17 and 18 to effect application and release of the brakes, a conduit 29 is provided for conducting fluid pressure from the reservoir 16 to the brake valve, while a conduit 30 is adapted to conduct fluid pressure from the brake valve to the brake actuators 17 and 18 through conduits 31 and 32 by virtue of its connection therewith through bore 13 of nozzle 12, casing 5 and the outlet ports 10 and 11 provided in the casing of the device 4 as heretofore described.

The self-lapping brake valve 19 is provided with the usual inlet and exhaust valves and is operative on movement of lever 20 in one direction to close the exhaust valve and open the intake valve to establish communication between conduits 29 and 30, and operative on movement thereof in the other direction to open the exhaust valve to establish communication between conduit 30 and an exhaust conduit 33 having a connection with the exhaust valve of control valve 19. It will thus be seen that, on operation of lever 20, the valve 19 will be effective to connect conduits 29 and 30 and fluid pressure will be conducted from reservoir 16 to the rear brake actuators 18 through conduit 29, valve 19, conduit 30, bore 13 in nozzle 12, casing 5 and conduits 32, the rapid flow of fluid through nozzle 12 cooperating with the restricted passage 7 of casing 5 to create a partial vacuum in the enlarged chamber 8 of the casing which will evacuate a portion of fluid from the front brake actuators 17 through ports 10 and conduits 31. If the lever 20 is now held in a given position, it will be apparent that the valve 19, by virtue of its self-lapping action, will act to maintain a corresponding pressure in conduit 30, and the pressures in conduit 30, nozzle 12, casing 5, conduits 32 and actuators 18 will tend to become equalized, resulting in a reduction in the rate of fluid flow through the nozzle 12. Since the pumping or evacuating action of the fluid flow control device 4 is dependent on the velocity of fluid flow through the nozzle 12, it will be evident that, as the rate of flow diminishes, a point will be reached when the pressure in chamber 9 of the casing will be sufficient to overcome the evacuating effect of the fluid flowing through nozzle 12, and fluid pressure will then be conducted to the front brake actuators 17 through ports 10 and conduits 31, thus effecting an application of the front brakes, the pressures eventually becoming equalized throughout the system. If the lever 20 is now moved to effect a release of the brakes, however, the mode of operation of the control device 4 will be entirely different from that hereinbefore explained. Movement of the lever 20 as above described will condition the control valve 19 to establish a connection between conduit 30 and the exhaust conduit 33, whereupon fluid pressure will be released to atmosphere from the front and rear brake actuators 17 and 18 through conduits 31 and 32 and ports 10 and 11 respectively, and thence through casing 5, bore 13 of nozzle 12, conduit 30, control valve 19 and exhaust conduit 33. It will be apparent, therefore, that the flow of fluid in casing 5 will be from both ends toward the center, with the result that fluid is released from the front and rear brake chambers at approximately the same rate if the conduits 31 and 32 are of substantially equal length.

There has thus been provided in the illustrated and hereinbefore described structure a novel and efficient device having no moving or wearing parts, and which is highly effective in automatically insuring progressive application of different brakes on a vehicle without in any way lessening the degree of application of one brake in relation to another on completion of the application.

While the invention has been described above as being incorporated in the brake system of a single vehicle, it will be evident that it may be applied with equal effectiveness to the brake systems of a series of vehicles, as on a tractor-trailer train, it being well known that, with the ordinary fluid pressure brake systems now in use, there is a tendency for the brakes to apply on the leading vehicle first and sequentially on the following vehicles. This sequence of brake application often results in skidding of the vehicles, and when operating on slippery pavements has often been the cause of serious and costly accidents.

Referring more particularly to Fig. 2 of the drawings, wherein applicant's novel fluid flow control system is illustrated as applied to a train of vehicles which may include a tractor and two trailers, indicated diagrammatically, it is to be noted that each vehicle is equipped with a fluid flow control device 4. The self-lapping brake valve 19 is adapted to supply fluid pressure to the device 4 on the tractor through conduit 30 and thence to the similar devices 4 on the following vehicles through conduits 34, 35, 36 and 37, and provision is made for supplying air to an additional vehicle through conduits 38 and 39 and coupling device 40, a valve 41 in conduit 39 being normally closed to prevent the escape of fluid through the coupling device 40. The vehicles of the train are equipped with brake actuators 17, 45 and 46 respectively, and the fluid flow control devices 4 of the corresponding vehicles are connected thereto by means of ports 10 and conduits 42, 43 and 44. It will be apparent from the foregoing description that the series of conduits 30, 34, 35, 36, 37 and 39 form a conduit common to all the vehicles of the train, while the control devices 4 on the different vehicles are adapted to establish a connection between the common conduit and the brake actuators 17, 45 and 46 through the corresponding conduits 42, 43 and 44.

If the brake valve is now operated to effect a brake application, fluid pressure will flow from the reservoir 16 to the series of conduits 30, 34, 35, 36, 37 and 39 forming the common conduit as heretofore described, through conduit 29 and valve 19, the flow of fluid through the devices 4 cooperating therewith to successively evacuate the actuators 17, 45 and 46 in the manner already described. Due to the fact that the volume of the portions 38 and 39 of the common conduit at the rear of the device 4 on the second trailer is relatively small, however, the pressure in the casing 5 of the device will build up very rapidly, immediately nullifying the effectiveness of the device in evacuating the actuators 46 and permitting the flow of fluid pressure thereto through conduits 44. As the pressure builds up in actuators 46, the velocity of fluid flow through nozzle 12 of device 4 on the first trailer will decrease to a value such that the evacuating effect of the fluid flowing through the device on the first trailer will cease, and fluid pressure will flow from the common conduit through device 4, and conduits 43 to the brake actuators 45 on the first trailer, it being obvious that this action will take place after the initiation of a brake application on the second trailer. In like manner, fluid pressure will be conducted thereafter to brake actuators 17 on the tractor through device 4 and conduits 42, and, if the brake valve lever 20 is held in a position to effect a predetermined degree of brake application, the pressures in the various parts of the system will eventually equalize and the brake valve 19, by virtue of its self-lapping property, will act to maintain the predetermined pressure in the brake system. On operation of the brake valve to release the brakes, the devices 4 will not materially effect the flow of fluid from the actuators through the brake valve and thence to atmosphere through exhaust conduit 33, and the actuators on the tractor, being nearest the brake valve, will start to exhaust first, the actuators of the first and second trailers starting to exhaust thereafter in the sequence named, as would be the case in the ordinary fluid brake system having the common conduit connected to actuator supply conduits 42, 43 and 44 through ordinary pipe connections instead of through the fluid flow control devices 4. This latter action is well known and also desirable in the operation of the common single pipe fluid pressure brake system, and it will be apparent from the foregoing description that the inclusion of the fluid flow control devices in a system of this type not only retains the advantages inherent therein, but also overcomes in a simple and efficient manner the tendency of such systems to initiate a brake application at the forward end of the train, the result being that the tendency of the rear vehicles to run in on the forward vehicles is eliminated under all conditions of brake application and release.

A modified form of fluid flow control device 47 is illustrated in Fig. 3. As illustrated, the valve comprises a casing 47a provided with an inlet port 48 and outlet ports 49, the right end of the casing being adapted to threadedly receive a closure member 50 having a member 51 extending into the casing and forming a chamber 51a therein. The member 51 is formed with a bore 53, substantially in alignment with the inlet port 48, and provides an additional outlet port from the casing 47a. A valve seat 52 is formed on the left end of member 51. In order that the flow of fluid through the casing 47a may be controlled in accordance with the principles of the present invention, a valve member 54 having guide fingers 55 formed thereon and having also a relatively restricted port 55a through the center thereof is positioned within the casing 47a and is normally urged against stops 56 as by means of a spring 57 interposed between the closure member 50 and the valve member. The valve is thus normally maintained in spaced relationship with respect to the valve seat 52 formed on the member 51, and, in view of the arrangement of the valve guide fingers 55, illustrated in detail in Fig. 4 of the drawings, it will be noted that the inlet port 48, the outlet ports 49 and the bore 53 are in substantially unrestricted communication with the chamber 51a under ordinary conditions.

It will be apparent from the foregoing description that, on admission of fluid pressure to the chamber 51a through the inlet port 48, a force dependent on the rate of fluid flow will be set up on the valve member 54 tending to move it to the right against the seat 52, and consequently the value of the spring 57 may be so chosen as to permit such movement of the valve when the flow of fluid through port 48 exceeds a predetermined rate, the valve being thereafter held against the seat 52 by virtue of the pressure differential between chamber 51a and bore 53 set up by the action of the relatively small port 55a of the valve.

The valve device described above is more particularly adapted to effect progressive application of two sets of brakes, and, if it is desired to substitute it for the device 4 in the system illustrated in Fig. 1 this may be accomplished by connecting conduits 31 to bore 53 of the valve by the use of ordinary tubing fittings, not shown, and by connecting conduits 32 to ports 49 in like manner, the brake valve 19 being connected to the chamber 51a of the valve 47 by means of conduit 30 and port 48. On operation of the brake valve to supply fluid pressure to conduit 30, it will be apparent that the impact of the fluid against the left face of valve member 54 will move the valve against the seat 52, thus providing a restricted connection between the brake chambers 17 and the valve chamber 51a through conduits 31, bore 53 and port 55a, and relatively unrestricted communication between brake chambers 18 and the valve chamber 51a through conduits 32 and ports 49. Thus the pressure in the rear brake chambers will build up at a faster rate than that in the front brake chambers, resulting in progressive application of the rear and front brakes. As the pressures build up in chamber 51a and bore 53, they will tend to equalize through the valve port 55a, and the force exerted on the valve toward the right by the pressure differential between chamber 51a and bore 53 will eventually become less than the force exerted on the valve toward the left by spring 57, at which time the valve will be moved to open position and conditioned to permit a relatively unrestricted exhaust of fluid from all the brake chambers on subsequent brake releasing operation of the brake valve.

While two embodiments of the invention have been disclosed herein and have been described with considerable particularity, it is to be understood that the invention is not limited thereto, and various changes may be resorted to without departing from the spirit of the invention. Reference will, therefore, be had to the appended claims for a definition of the limits of the invention.

What is claimed is:

1. A fluid pressure brake system including a pair of brake actuators, conduits for supplying fluid pressure to each of said actuators, means for supplying fluid pressure to said conduits, and means for connecting said first named means with said conduits and responsive to the flow of fluid therethrough to one of said actuators for temporarily evacuating said other actuator and delaying the flow of fluid thereto.

2. A fluid pressure brake system including a pair of brake actuators, conduits for supplying fluid pressure to each of said actuators, means for supplying fluid pressure to said conduits, and means for connecting said conduits and said first named means and responsive to the rate of fluid flow therethrough to one of said actuators for controlling the rate of fluid flow to said other actuator.

3. A fluid pressure brake system including a pair of brake actuators, conduits for supplying fluid pressure to each of said actuators, means for supplying fluid pressure to said conduits, and means for connecting said conduits and first named means and responsive to the rate of fluid flow therethrough to one of said actuators for limiting the fluid flow to said other actuator to a rate less than the rate of flow to said first named actuator.

4. A fluid pressure brake system for vehicles including front brake actuators, rear brake actuators, conduits for supplying fluid pressure to said front brake actuators, conduits for supplying fluid pressure to said rear brake actuators, means for supplying fluid pressure to said conduits for effecting a brake application, and means including a jet and a Venturi tube for connecting said first named means and conduits, the flow of fluid pressure through said jet to said rear brake actuators cooperating with said Venturi tube to evacuate said front brake actuators.

5. A fluid pressure brake system for a plurality of vehicles including a brake actuator on each vehicle, a conduit carried by each vehicle for supplying fluid pressure to said actuator, a conduit common to all of the vehicles for supplying fluid pressure to said vehicle-carried conduits, means carried by the leading vehicle for supplying fluid pressure to said common conduit for effecting a brake application, and fluid flow control means carried by each vehicle for connecting said vehicle-carried conduits with said common conduit, said means being rendered effective by the flow of fluid pressure therethrough from the supply means on the leading vehicle to the brake actuator on the rear vehicle through said common conduit for progressively supplying fluid pressure to the brake actuators on the forward vehicles subsequent to the supplying of fluid pressure to the brake actuator on the rear vehicle.

6. A fluid pressure brake system for a train of vehicles including a brake actuator on each vehicle, a conduit carried by each vehicle for supplying fluid pressure to said actuator, a conduit common to all the vehicles for supplying fluid pressure to said vehicle-carried conduits, means carried by the leading vehicle for supplying fluid pressure to said common conduit for effecting a brake application, and means including a jet and a Venturi tube carried by each vehicle for connecting said vehicle-carried conduits and said common conduit, the flow of fluid pressure from the leading vehicle supply means to the actuator on the rear vehicle through said common conduit and jets cooperating with said Venturi tube for thereafter progressively supplying fluid pressure to the actuators on the forward vehicles.

7. In a fluid pressure brake system, a source of fluid pressure, a pair of brake actuators, means including a conduit connected to said source and conduits connected to said brake actuators for conducting fluid pressure from the source to said actuators for effecting a brake application, and common connecting means for said conduits including a valve operable by the flow of fluid pressure therethrough to one of said actuators for limiting the rate of fluid flow therethrough to said other actuator.

8. In a fluid pressure brake system, a source of fluid pressure, a pair of brake actuators, conduits connected to said actuators, a conduit connected to said source, valvular means associated with said last named conduit for controlling the flow of fluid pressure to said actuators, and common connecting means for said valvular means and first named conduits including a resiliently biased valve so constituted as to provide unrestricted communication between said valvular means and actuators during the flow of fluid pressure therethrough at a low velocity and operable by the flow of fluid pressure therethrough at a higher velocity for restricting the rate of flow of fluid pressure to one of said actuators.

9. The combination with a fluid pressure brake system including a source of fluid pressure, a pair of brake actuators and means including a valve for controlling the flow of fluid pressure to said actuators, of means for connecting said valve and actuators including a device operable by the flow of fluid pressure therethrough to one of said actuators for limiting the rate of flow of fluid pressure to said other actuator.

10. In a fluid pressure brake system, means for controlling the flow of fluid from a source of fluid pressure to a pair of fluid motors comprising a casing having an inlet port and outlet ports, and means responsive to the rate of flow of fluid through said inlet port for partially closing one of said outlet ports.

11. In a fluid presure brake system, means for controlling the flow of fluid from a source of fluid pressure to a pair of fluid motors including a casing having an inlet port and outlet ports, and normally open valve means associated with one of said outlet ports and operable by the flow of fluid through said inlet port at a rate exceeding a predetermined velocity for partially closing said one outlet port.

12. In a fluid pressure brake system, means for controlling the flow of fluid from a source of fluid pressure to a pair of fluid motors including a casing having outlet ports, a valve member movable for partially closing one of said ports, resilient means for normally maintaining said valve member in open position, and an inlet port for directing a jet of fluid from said source against said valve for moving it to port closing position.

13. In a fluid pressure brake system, means for controlling the flow of fluid from a source of fluid pressure to a pair of fluid motors including a casing having a Venturi tube formed therein and outlet ports leading therefrom, and an inlet port for directing a jet of fluid from said source through said Venturi tube for effecting a differential in the rate of fluid flow through said outlet ports to said motors.

14. A fluid pressure brake system including a pair of brake actuators, conduits for supplying fluid pressure to each of said actuators, means including a valve operable for controlling the flow of fluid pressure to and from said actuators, and means connecting said valve and conduits for effecting a differential rate of flow of fluid from the valve to said actuators and a substantially equal rate of flow of fluid from said actuators to atmosphere during corresponding controlling operations of said valve.

15. A fluid pressure brake system for a plurality of vehicles including a brake actuator on each vehicle, a conduit carried by each vehicle for conducting fluid presure to and from said actuator, a conduit common to all of said vehicles for conducting fluid pressure to and from said vehicle-carried conduits, means carried by the leading vehicle for controlling the flow of fluid pressure to and from said common conduit, and means carried by each vehicle for connecting said common conduit with said vehicle-carried conduits, said last named means being responsive to the flow of fluid pressure in the common conduit toward the rearmost vehicle for effecting progressive application of pressure to the brake actuators starting at the rear vehicle, and being effective on a reverse flow of fluid pressure through said common conduit for insuring the release of pressure from said actuators in reverse order.

16. In a brake system having a pair of fluid motors for actuating the brakes, conduits for conducting fluid to and from the motors, means for controlling the application of a fluid pressure differential to said motors, and means for connecting said conduits and controlling means and responsive to the rate of flow of fluid therethrough to one of said motors from said controlling means for effecting a different rate of fluid flow to said other motor.

17. In a fluid pressure braking system having a plurality of brake actuators, means for conducting fluid pressure to said actuators, and means associated with said conducting means and responsive to the flow of fluid therethrough to some of said actuators for delaying the flow of fluid pressure to other of said actuators.

WILFRED A. EATON.